(12) United States Patent
Hudin et al.

(10) Patent No.: US 9,436,284 B2
(45) Date of Patent: Sep. 6, 2016

(54) TIME-REVERSAL TACTILE STIMULATION INTERFACE

(71) Applicant: Commissariat à l'énergie atomique et aux énergies alternatives, Paris (FR)

(72) Inventors: Charles Hudin, Paris (FR); Vincent Hayward, Paris (FR); José Lozada, Massy (FR); Michaël Wiertlewski, Paris (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 45 days.

(21) Appl. No.: 14/405,634

(22) PCT Filed: Jun. 5, 2013

(86) PCT No.: PCT/EP2013/061616
§ 371 (c)(1),
(2) Date: Dec. 4, 2014

(87) PCT Pub. No.: WO2013/182611
PCT Pub. Date: Dec. 12, 2013

(65) Prior Publication Data
US 2015/0169060 A1    Jun. 18, 2015

(30) Foreign Application Priority Data
Jun. 6, 2012 (FR) ...................................... 12 55286

(51) Int. Cl.
*G06F 3/041* (2006.01)
*G06F 3/045* (2006.01)
*G06F 3/01* (2006.01)

(52) U.S. Cl.
CPC .................................... *G06F 3/016* (2013.01)

(58) Field of Classification Search
CPC ............. G06F 3/016; G06F 2203/013; G06F 2203/014; G06F 2203/015
USPC .................................................. 345/173–179
See application file for complete search history.

(56) References Cited

U.S. PATENT DOCUMENTS

2001/0001603 A1    5/2001   Fink
2009/0167704 A1    7/2009   Terlizzi
(Continued)

FOREIGN PATENT DOCUMENTS

EP    0 944 035 B1    9/1999
EP    2 372 505 A2    10/2011
(Continued)

OTHER PUBLICATIONS

U.S. Appl. No. 14/408,771, "Actuator with Hybrid Actuation for a Force Feedback Interface" filed Dec. 17, 2014.
(Continued)

*Primary Examiner* — Amit Chatly
(74) *Attorney, Agent, or Firm* — Pearne & Gordon LLP

(57) ABSTRACT

Tactile stimulation interface comprising a support (2), a flexible surface suspended on the support (2) intended to be tactilely explored by an operator, actuators (6) intended to apply a force on the flexible surface (4) and means for controlling the actuators (6), the actuators being located on the contour of the flexible surface. The control means are intended to send, to the actuators (6), signals corresponding to the forces to be applied to the flexible surface (4) according to the tactile stimulation to be generated on the flexible surface (4), the forces being determined by a time-reversal method. The surface (4) comprises at least one sufficiently flexible area, for example of Mylar®, in order for the propagation speed of the waves thus generated to be slow enough to reach sufficiently short wavelengths at low frequencies, thereby substantially improving focusing at resolutions compatible with tactile stimulation.

23 Claims, 7 Drawing Sheets

(56) References Cited

U.S. PATENT DOCUMENTS

| | | |
|---|---|---|
| 2010/0225456 A1 | 9/2010 | Eldering |
| 2010/0225596 A1 | 9/2010 | Eldering |
| 2011/0267294 A1 | 11/2011 | Kildal |
| 2011/0304581 A1 | 12/2011 | An |
| 2012/0075210 A1 | 3/2012 | Coni |
| 2012/0113020 A1* | 5/2012 | Bai .................. G06F 3/043 345/173 |
| 2012/0326999 A1* | 12/2012 | Colgate ............. G06F 3/016 345/173 |
| 2013/0151960 A1 | 6/2013 | Wiertlewski |
| 2015/0153828 A1* | 6/2015 | Monkhouse ......... G06F 3/044 345/174 |
| 2015/0162853 A1 | 6/2015 | Leroy |

FOREIGN PATENT DOCUMENTS

| | | |
|---|---|---|
| EP | 2 381 338 A1 | 10/2011 |
| WO | 2011106021 A1 | 9/2011 |

OTHER PUBLICATIONS

Laura Winfield et al., "T-PaD: Tactile Pattern Display through Variable Friction Reduction" Proceedings of the Second Joint EuroHaptics Conference and Symposium on Haptic Interfaces for Virtual Environment and Teleoperator Systems, World Haptics, 2007.

Kurt A. Kaczmarek et al., "Polarity Effect in Electrovibration for Tactile Display" IEEE Transactions on Biomedical Engineering, vol. 53, No. 10, Oct. 2006.

Ros Kiri Ing et al., "In solid localization of finger impacts using acoustic time-reversal process" Applied Physics Letters, vol. 87, 2005.

Charles Hudin et al., "Tradeoffs in the Application of Time-Reversed Acoustics to Tactile Stimulation" Haptics: Perception, Devices, Mobility and Communication: 8th International Conference, EuroHaptics 2012.

Mathias Fink, "Time Reversal of Ultrasonic Fields-Part I: Basic Principles" IEEE Transactions on Ultrasonics, Ferroelectrics, and Frequency Control, vol. 39, No. 5, Sep. 1992.

Najet Chakroun et al., "Time Reversal Processing in Ultrasonic Nondestructive Testing" IEEE Transactions Ultrasonics, Ferroelectrics, and Frequency Control, vol. 42, No. 6, Nov. 1995.

Michael Wiertlewski et al., "Causality Inversion in the Reproduction of Roughness" Proceedings of Europhaptics 2010, Part II.

Jerome Pasquero, "Survey on Communication through Touch" Technical Report: TR-CIM 06.04, McGill Centre for Intelligent Machines, 2006.

Vincent Hayward et al., "Tactile Display Device using Distributed Lateral Skin Stretch" Accepted in Symposium on Haptic Interfaces for Virtual Environment and Teleoperator Systems, IMECE 2000 Conference, Nov. 5-10, 2000.

Melisande Biet et al., "Squeeze Film Effect for the Design of an Ultrasonic Tactile Plate" EEE Transactions Ultrasonics, Ferroelectrics, and Frequency Control, vol. 54, No. 12, Dec. 2007.

Mohamed Benali-Khoudja et al., "Tactile interfaces: a state-of-the-art survey" ISR 2004, 35th International Symposium on Robotics, Mar. 2004.

Mingsian R. Bai et al., "Impact localization combined with haptic feedback for touch panel applications based on the time-reversal approach" Journal Acoust. Soc. Am. vol. 129, No. 3, Mar. 2011.

Search Report issued in French Patent Application No. FR 12 55286 dated Jan. 31, 2013.

International Search Report issued in Application No. PCT/EP2013/061616 dated Jul. 29, 2013.

Written Opinion issued in Application No. PCT/EP2013/061616 dated Jul. 29, 2013.

* cited by examiner

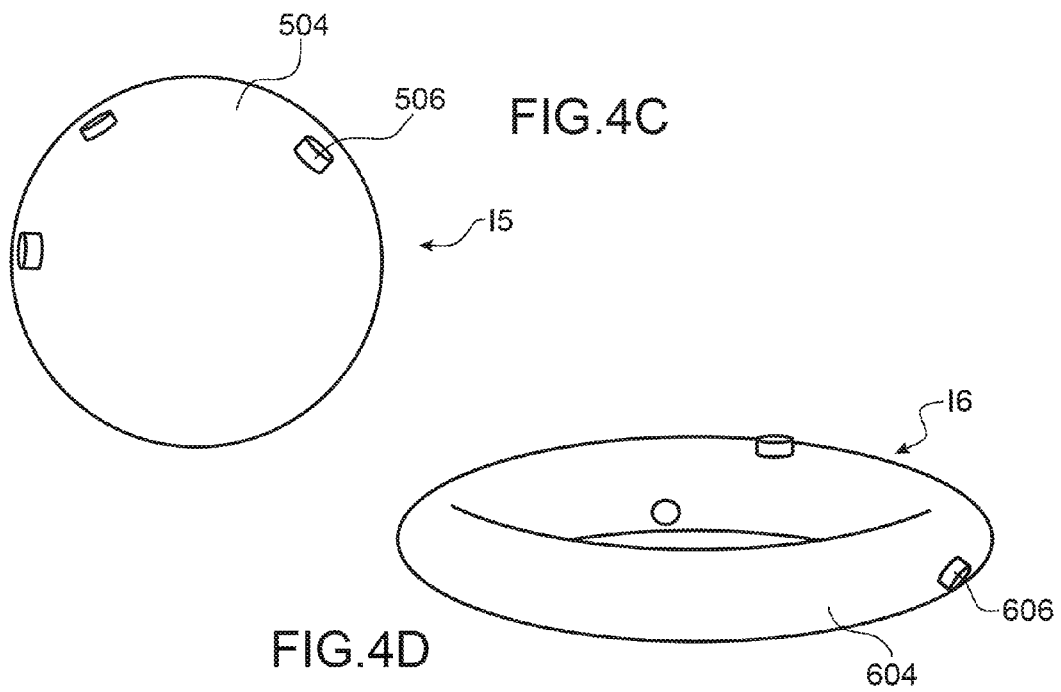
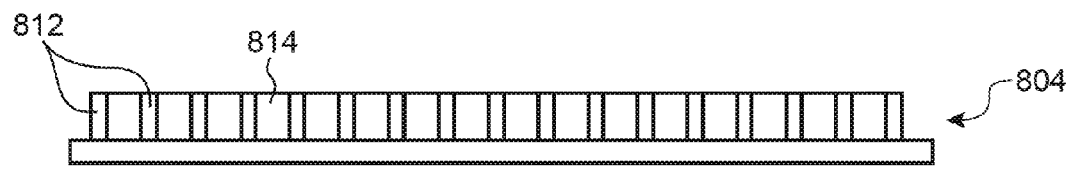
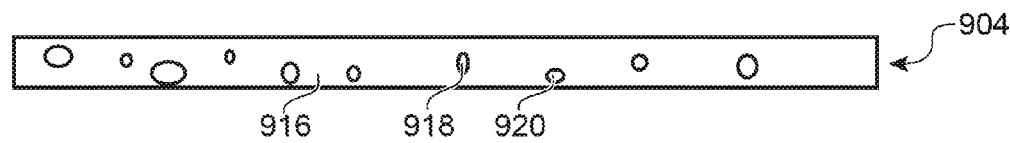

T=0,13 ms

T=0,82 ms

T=1,63 ms

T=2,45 ms

T=3,27 ms

T=4,08 ms

T=4,90 ms

T=5,72 ms

T=6,53 ms

T=7,35 ms

T=7,62 ms

T=8,17 ms

T=0.13 ms

T=1.58 ms

T=3.17 ms

T=4.75 ms

T=6.33 ms

T=7.91 ms

T=9.50 ms

T=11.08 ms

T=12.66 ms

T=14.02 ms

T=15.16 ms

T=15.77 ms

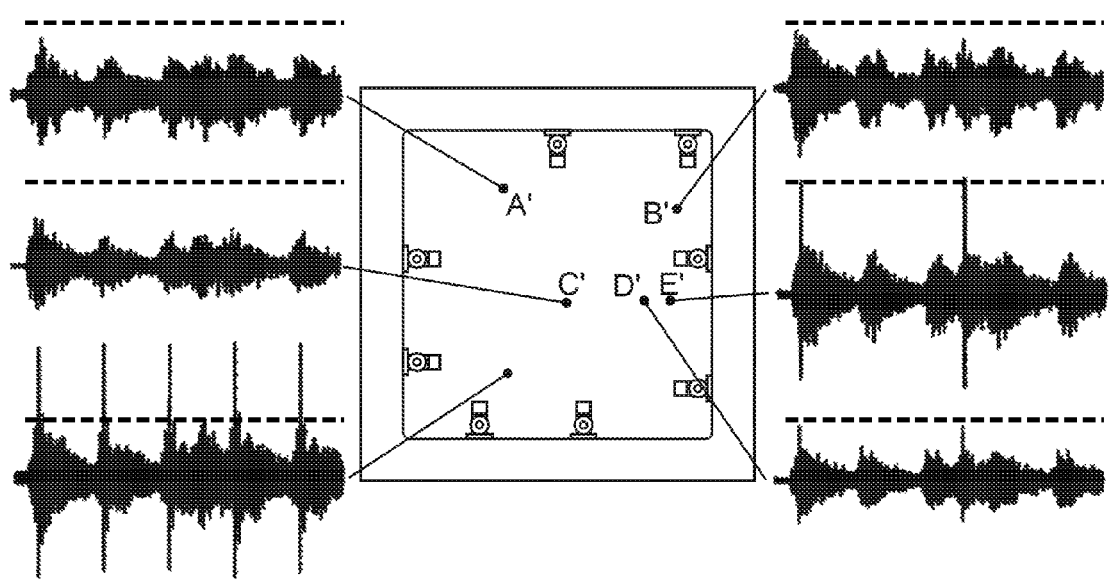

TIME-REVERSAL TACTILE STIMULATION INTERFACE

TECHNICAL FIELD AND PRIOR ART

This invention relates to a time-reversal tactile stimulation interface, enabling tactile stimuli of variable shapes and sizes to be displayed.

A tactile stimulation interface is intended to provide tactile information, such as a texture, a relief, or a roughness variable over time and/or space.

Such interfaces are used, for example, in the field of human-machine interfaces. They may also be used in the fields of optics, acoustics, chemistry and automated manufacturing.

To produce such a tactile interface making it possible to display a tactile pattern, a matrix of actuators is commonly used, each actuator directly imposing a normal or tangential, static or dynamic movement on the surface of the skin. The resolution of such interfaces is limited by the size of the actuators. Moreover, these interfaces are bulky and require a large number of actuators proportionally to the tactile surface explored, each corresponding to a tactile pixel. Finally, the presence of these actuators below the surface to be explored renders the interface opaque, which does not enable it to be superimposed on a screen. Such an interface is, for example, described in the document Benali-Khoudja, M. Hafez, J. M. Alexandre, and A. Kheddar, 2004. *Tactile interfaces: a state of the art survey. Proc. International Symposium on Robotics.*

In other interfaces, the surface to be explored vibrates tangentially according to the position of the contact with respect to the pattern. It is then possible to give the illusion of borders and textures by modulating the shear force according to the position of the finger on the surface. The entire plate has the same movement, and it is not possible to stimulate multiple fingers differently: two fingers exploring the surface will receive the same stimulus.

The document "*Impact localization combined with haptic feedback for touch panel applications based on the time-reversal approach*", M. R. Bai and Y. K. Tsai, 2011—*The Journal of the Acoustical Society of America,* 129(3), 1297-1305 describes an interface using the time-reversal method to propagate acoustic waves in a glass plate and produce a tactile stimulation interface.

The time-reversal method consists in concentrating acoustic energy in a given location. This method is used, for example, for destruction of a tumour or destruction of an explosive device, such as a mine.

The tactile stimulation interface propagating acoustic waves in a thick glass plate, for example having a thickness greater than 1 mm, has a number of disadvantages. The speed of the waves in the glass is high, on the order of 1500 m/s. Thus, to obtain a focal spot on the order of the cm, frequencies on the order of 150 kHz are required. To obtain a movement sufficient to be perceived, very high powers are necessary. Finally, the flexural rigidity of a 2 mm glass plate is too high to be capable of obtaining a movement sufficient for tactile use. For example, this document mentions movements of 2 μm, for a focal spot 3 cm wide.

Document US2010/0225596 describes a tactile interface comprising an elastomer membrane stretched over a frame comprising piezoelectric actuators and generating stationary waves in the membrane. This interface does not make it possible to generate stimuli localized in time and space.

DESCRIPTION OF THE INVENTION

It is therefore an objective of this invention to offer a tactile stimulation interface having good spatial resolution and good time resolution and offering large movements capable of tactile detection.

It is an additional objective of this invention to offer a tactile interface making it possible to generate patterns of complex shapes, such as image contours.

The aforementioned objectives are achieved by a tactile stimulation interface implementing a time-reversal method, said interface comprising an element, at least one face of which is intended to deliver tactile stimulation, actuators capable of emitting signals in order to propagate an acoustic wave in the interface element, said element being formed by a flexible surface, the signals applied to the surface being determined by the time-reversal method.

As the element in which the acoustic waves are propagated is flexible, the acoustic waves are propagated through it slowly enough to achieve sufficiently short wavelengths at low frequencies improving the focusing at resolutions compatible with tactile stimulation. The flexible surfaces make it possible to obtain low radii of curvature and therefore large movements with a short wavelength.

The actuators may be separate, on a frame supporting the tactile surface. The stimuli generated by the acoustic waves are independent of the position of the finger, enabling multi-finger exploration of the surface. The stimuli may be repeated, for example, with a frequency on the order of 100 Hz, over time and in an amplitude-modulated manner. These stimuli may be located in any location at the surface, focused at a single point or describing the contour of a shape.

Since the actuators may be located on the edge of the interface element, the element may be transparent and applied on a screen.

The tactile surface is, for example, formed by a film made of a polymer material, a composite material, a thin glass plate with a thickness on the order of 100 μm, or a flexible screen.

In other words, the invention relates to a stimulator capable of creating modifiable deformations in a surface in order to display a relief or localized vibrations that can be tactilely perceived and capable of changing over time. It has a surface activated by one or more actuators. These actuators exert, on said surface, forces calculated according to the time-reversal method. This method enables an acoustic wave to be focused on one or more points or lines of the surface, leading to a perceptible amplitude peak localized in time and space. This dynamic tactile stimulator enables the surface to be explored with multiple fingers or portions of the hand, such as the palm.

The subject-matter of the present invention is a tactile stimulation interface comprising an element intended to be tactilely explored by an operator, said element intended to be tactilely explored being formed by at least one surface, at least one actuator configured to apply a force on said surface, and means for controlling said at least one actuator, said control means being configured to send, to the actuator, signals corresponding to the forces to be applied to said surface according to the tactile stimulation to be generated on the surface, said forces being determined by a time-reversal method, said surface being comprised of at least one area such that:

$$\frac{c^3(\lambda)}{\rho\lambda} < 10^{13}$$

$$\forall \lambda \geq 2 \text{ cm}$$

λ being the wavelength of the bending waves being propagated in said area, c being the speed of the bending waves, ρ being the mass per surface unit of said area, and said at least one actuator having a bandwidth extending between 1 Hz and 20 kHz so as to excite a large number of modes specific to said surface.

In an advantageous example, the interface comprises at least one support forming a frame holding the surface, said actuator being located near the frame.

In one example, the actuator may apply a force directly on the surface, perpendicularly to it. In another example, the actuator applies a force directly onto the support.

In one example embodiment, the interface comprises a support in the form of a frame from which the surface is suspended, at least one first and one second actuator, the first actuator applying a force directly on the surface and the second actuator applying a force on the support.

In another example embodiment, the surface defines a closed volume filled with a pressurized fluid, said surface being stretched by the pressurized fluid, said interface comprising a support for said closed volume and at least one actuator mounted on the support.

In an advantageous embodiment, the interface comprises at least one sensor of a parameter capable of influencing the effect of the forces on the surface.

The interface may also comprise at least one sensor for detecting the presence of the operator in contact with the interface.

The actuator is, for example, an electromagnetic actuator. The actuator may be comprised of a coil, a soft iron core and a magnet, said magnet being fixed on the surface and the coil being fixed on the support.

According to a variant, the actuator is made of a piezoelectric material. The actuator can then comprise a beam, one end of which is built into the support and the other end of which is intended to apply a force on the surface.

According to another feature, the surface may be equipped with pins intended to come into contact with the operator.

According to another feature, the surface may be comprised of at least two different materials and/or phases.

In an advantageous embodiment, the surface is transparent.

For example, the surface is comprised of at least one film of a polymer material or a composite material. This may then be stretched over the support.

In another example, the surface is comprised of at least one glass plate having a thickness of around 100 μm.

The control means may be comprised of a modal base or an impulse response base. The impulse response base may contain signals to be transmitted to the actuator, said signals having been determined by the time-reversal method.

The modal base may be comprised of a unit for determining signals to be transmitted to the actuator by the time-reversal method.

The control means may be comprised of an actuator controller transmitting said signals to said actuators.

Preferably, the speed of the bending waves is on the order of 50 m/s.

BRIEF DESCRIPTION OF THE DRAWINGS

This invention will be better understood in view of the following description and the drawings, wherein:

FIGS. 4C and 4D are schematic representations of different examples of the tactile interface according to the invention, the surface defining a volume filled with a pressurized gas, FIGS. 7A to 7C are cross-section views of different examples of a surface capable of being implemented in the interface according to the invention, FIG. 10 is a top view of an example of an interface and graphic representations of the movement of different points of the interface over 1 second.

DETAILED DESCRIPTION OF SPECIFIC EMBODIMENTS

Figure 1A:
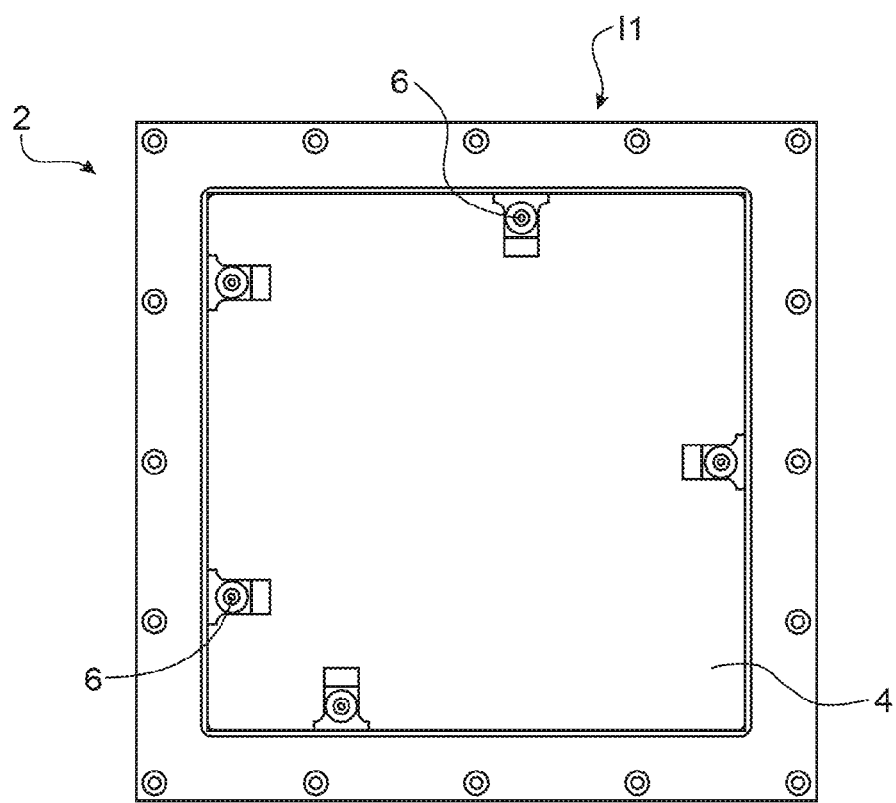
FIG. 1A is a top view of an example embodiment of a tactile stimulation device.
Figure 1B:
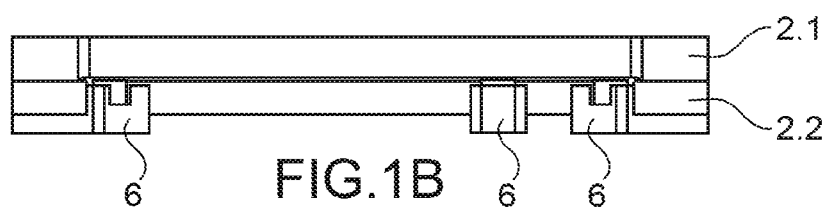
FIG. 1B is a cross-section view of FIG. 1A according to plane A-A.
Figure 1C:
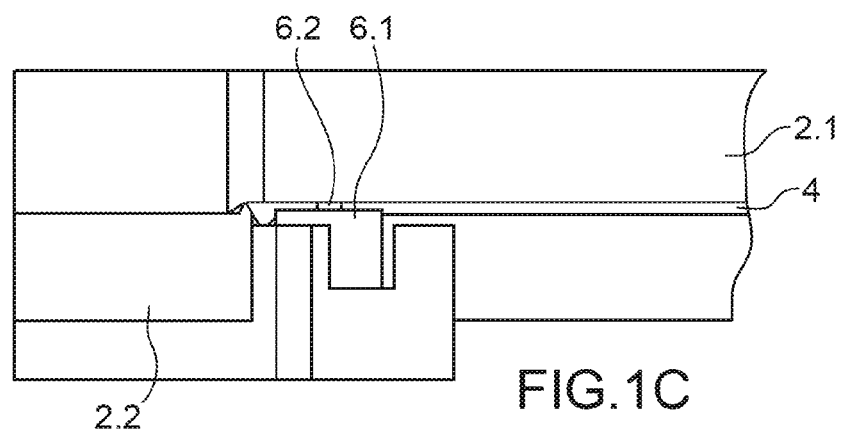
FIG. 1C is a detail view of FIG. 1B at the level of an actuator.

FIGS. 1A to 1C show a first example embodiment of an embodiment of a tactile interface according to the invention.

The tactile interface 11 comprises a frame 2, an element equipped with a flexible surface 4 held on the frame 2 and actuators 6 fixed on the frame and capable of applying a mechanical stress on the surface 4, the stress being oriented transversely with respect to the surface. The suspended portion of the surface 4 forms a surface intended to be tactilely explored.

The actuators 6 are mounted on the interior edges of the frame so as to act on the contours of the surface 4. In the example shown, the actuators are mounted on tabs fixed on the lower frame 2.2

The frame 2 comprises an upper frame 2.1 supporting the surface and a lower frame 2.2 on which the actuators are mounted. The surface 4 is held between the lower frame 2.2 and the upper frame 2.1.

The surface 4 is intended to be the seat of bending waves or transverse waves generated by the stresses applied by the actuators. According to the invention, the bending waves are focused so as to produce tactile stimulation at the focal point.

The surface 4 is made of one or more materials such that:

$$\frac{c^3(\lambda)}{\rho\lambda} < 10^{13} \quad (I)$$

$$\forall \lambda \geq 2 \text{ cm}$$

where:

λ is the wavelength of the waves propagated in said area. For example, to obtain a resolution on the order of the size of the contact between the finger and the surface, wavelengths greater than or equal to 2 cm are used;

c is the speed of the bending waves, which is optionally dependent upon λ.

As an example, for a homogenous and isotropic material, the speed of propagation of the bending waves c is:

$$c = \sqrt{\frac{T + \frac{Eh^3}{12(1-v^2)}\left(\frac{2\pi}{\lambda}\right)^2}{\rho}}$$

T is the tension applied to the surface, E is the modulus of elasticity of the material, h is its thickness, ρ is the mass per surface unit, ν is the Poisson's ratio of the material and λ is the wavelength.

To obtain wavelengths of 2 cm at a frequency of less than 20 kHz, the maximum speed of propagation is:

$c=\lambda \cdot f=0.02 \times 20000=400$ m/s.

In the example of a stretched Mylar® membrane, propagation speeds on the order of 50 m/s are obtained.

ρ is the mass per surface unit of the stimulation area. For a homogenous and single-material surface, it is dependent upon the density of the material $\rho_v$, and its thickness h, i.e. $\rho=\rho_v*h$. For a Mylar® membrane with a thickness of 125 μm, $\rho=0.175$ kg/m².

The tactile surface is, for example, formed by a polymer material film, for example Mylar®, a composite material film, a thin glass plate, for example with a thickness on the order of 100 μm, or directly by a flexible screen.

The surface may be comprised of different areas each having a mass per unit of different surfaces, nevertheless, each area is such that it satisfies criterion (I).

As the size of the focal spot is associated with the smallest focused wavelength $\lambda_{min}$ by the relation $l=\lambda_{min}/2$, to construct a spot of size l=1 cm, wavelengths greater than or equal to $\lambda_{min}=2$ cm are generated.

As the frequency is associated with the wavelength by the relation $f_{max}=c/\lambda_{min}$, the actuators chosen to excite the surface then have a bandwidth from several hertz to $f_{max}$. These actuators therefore are not selected to excite certain modes, but all of the modes of which the frequency is contained within the bandwidth [1 Hz; $f_{max}$], i.e. [1 Hz; $c/\lambda_{min}$]=[1 Hz; 2c/l] wherein c is the propagation speed of the waves verifying the relation (I). A bandwidth on the order of [1 Hz; 20 kHz] is thus obtained. This bandwidth can thus include up to several hundred specific modes of the structure.

In practice, this covers several hundred modes. The actuator(s) is (are) therefore chosen so as to have a bandwidth covering all of the frequencies of these modes. Preferably, the actuator(s) is (are) chosen so as to be capable of exciting the surface at frequencies of between [1 Hz and 20 kHz].

In FIGS. 1B and 1C, it is possible to see in greater detail an example of actuators capable of being implemented in the tactile interface, i.e. offering a bandwidth wide enough to mobilize a large number of specific modes of the surface.

In the example shown, they are electromagnetic actuators having a copper coil 6.1, a soft iron core and a magnet 6.2, the latter being fixed on the lower face of the surface 4. The electrical power supply of the coil 6.1 generates a magnetic field through the soft iron core that acts on the magnet. A force normal to the plane of the surface is thus generated.

Alternatively, the actuators may be piezoelectric. In this case, the actuator, by being deformed by application of a tension, applies a force normal to the surface.

In the example shown, the interface comprises five actuators. However, this number is not limiting. It is possible, for example, to have 1, 10 or several dozen actuators, for example 40, distributed on the support 2.

The forces applied by the actuators 6 on the surface 4 are calculated by a time-reversal method, which enables the actuators to generate constructive progressive waves at one or more given point(s) on the surface and at a desired time. The user feels not the passage of a progressive wave but the amplitude reached at the point(s) and at the desired time due to the constructive interference. The actuator gain is adjusted so that the amplitude everywhere else is below the tactile sensitivity threshold. The tactile sensitivity threshold designates the lowest perceptible vibration amplitude. It is dependent upon the contact conditions and frequency but is around 10 μm. It is therefore possible to amplify or attenuate the movement of the surface so that only the amplitude reached at the focal points is greater than this threshold and therefore perceptible. The surface thus appears to be immobile except for the focal points.

Advantageously, the interface may be comprised of one or more sensors. For example, it may be a temperature sensor of the environment in which the interface is located. In fact, the temperature may modify the speed of propagation of the waves in the surface. This temperature information can therefore be used to correct the signals sent to the actuators in order to take into account this modification in propagation speed.

Sensors detecting the presence of the operator's fingers on the surface may also be implemented, thereby making it possible to generate tactile stimulation only in areas during exploration by fingers. The electrical consumption of the interface can then be reduced, which is particularly beneficial in the case of tactile stimulation interfaces applied to portable devices. These can involve, for example, optical sensors.

We will briefly describe the principle of the time-reversal method.

The principle of time reversal of waves is based on the invariance of the time-reversal wave propagation equation.

Consider an actuator exerting an impulse force at a point I. Consider a sensor located at point $A_n$ of the surface and recording, over time, the movement of this point out of the plane. Consider $h_{AnI}(t)$ with 0<t<T, the movement recorded at point An during a period T when an impulse force is exerted at point I at time ta=0. The principle of reciprocity indicates that we then have $h_{IAn}(t)=h_{AnI}(t)$: transmitter and receiver can thus be interchanged without modifying the signal recorded.

If at point An, the sensor is replaced by an actuator exerting a force $F(t)=h_{AnI}(T-t)$, i.e. the impulse response retransmitted by starting at its end. Then, at a point J, the following signal will be recorded:

$$s_n(t) = h_{AnI}(T-t) \otimes h_{JAn}(t) = \int_{-\infty}^{\infty} h_{AnI}(T-u) \cdot h_{JAn}(t-u) du$$

u is an integration variable that is used in the calculation but does not have a physical meaning.

If J and t are undefined, $h_{AnI}(T-t)$ and $h_{JAn}(t)$ are decorrelated, they interfere non-constructively, resulting in background noise with zero mean.

If J=I and t=T, then, owing to the principle of reciprocity:

$$S_n(T) = \int_{-\infty}^{\infty} h_{AnI}(T-u) \cdot h_{JAn}(T-u) du = \int_{-\infty}^{\infty} h_{AnI}(T-u)^2 du$$

The interference is then constructive, resulting in a much higher amplitude than at the other points.

The contrast is then defined as being the ratio between the movement at the focal point at time T and the standard deviation of this movement at any point.

If N actuators are used, their contributions are added to give:

$$s(t) = \sum_{n=1}^{N} s_n(t)$$

The contrast is proportional to the time T of the time-reversal window and the root of the number N of actuators:

$$C \propto T\sqrt{N}$$

In practice, the time T may be limited by vibration damping, and preferably a plurality of actuators are then used to achieve the desired contrast.

The maximum frequency of the signals defines the maximum resolution capable of being reached by the relation:

$$\lambda_{min} = \frac{c}{f_{max}}$$

The minimum width of the focal point is on the order of λ/2.

The impulse responses $h_{AnI}(t)$ may be obtained either experimentally by actually recording the impulse responses, or by stimulation or analytically when the geometry remains simple.

It is then possible to repeat the same experiment with an actuator at I and a plurality of sensors. Then, by inverting the sensors and the actuator, it is possible to generate constructive acoustic waves at point I at a desired time.

According to the invention, by implementing a sufficiently flexible surface as defined above, as a support for the propagation of acoustic waves, the acoustic waves will be propagated through it slowly enough, at a speed on the order of 50 m/s, to reach sufficiently short wavelengths at low frequencies, for example below 10 kHz, which makes it possible to improve focusing at resolutions compatible with tactile stimulation. The flexible surface also makes it possible to obtain radii of curvature and therefore large movements at short wavelengths. Owing to the invention, the time-reversal tactile stimulation interface has good spatial resolution and good time resolution.

The signals sent to the actuators are calculated according to the time-reversal method and derived either from experimental measurements or from stimulations. The duration of the forces applied at the surface is variable, for example on the order of 10 ms, according to the pattern to be focused and the desired contrast, and the forces may be repeated at a desired frequency and amplitude. The contrast and amplitude obtained at the focal point are dependent upon the size of the interface, the vibration damping and the number of actuators. The number of actuators may be chosen according to the interface.

FIG. 10 shows a top view of the interface equipped with a surface 4 held on a support 2 and actuators 6, and the graphic representation of the movement of six points of the surface A', B', C', D', E', F' for 1 second.

Only points E' and F' are focused, the focusing being repeated at two different frequencies (2 Hz at E', 5 Hz at F'). Only "background noise" appears at the level of points A', B', C', D'. The dotted line shows the tactile perception threshold. A movement having an amplitude lower than this threshold is not tactilely perceptible. Thus, only points E' and F' are tactilely stimulated, and the movement of the surface at points A', B', C', D' is not tactilely perceptible. It is therefore possible to amplify or attenuate the movement of the surface so that only the amplitude reached at the focal points is perceptible.

Figure 2:
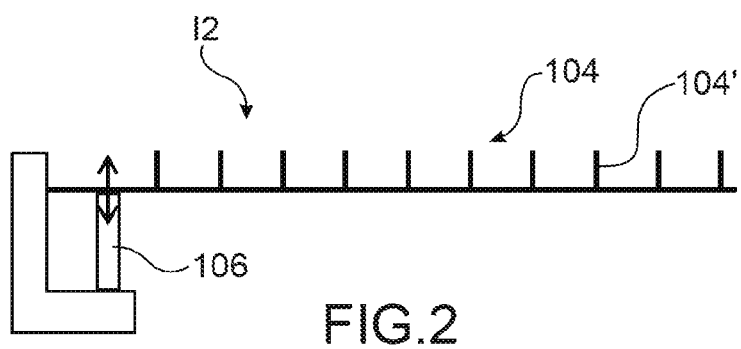
FIG. 2 is a cross-section view of another example embodiment of a tactile stimulation interface, the tactile surface having pins.

FIG. 2 shows another example of an interface in which the interface element comprises a surface 104 equipped with pins 104' projecting from the face with which the operator comes into contact. The actuators 106 are piezoelectric actuators in the example shown.

Figure 3:
FIG. 3 is another example of a tactile stimulation interface implementing an actuator of the built-in beam type.

FIG. 3 shows another example embodiment of an interface 13 equipped with a piezoelectric actuator 206 of the "bender" type, i.e. it is formed by a powder embedded by a longitudinal end in the support 202 and when it is deformed, it is deformed by bending so as to come into contact with the surface and apply a force on the surface 204.

Figure 4A:
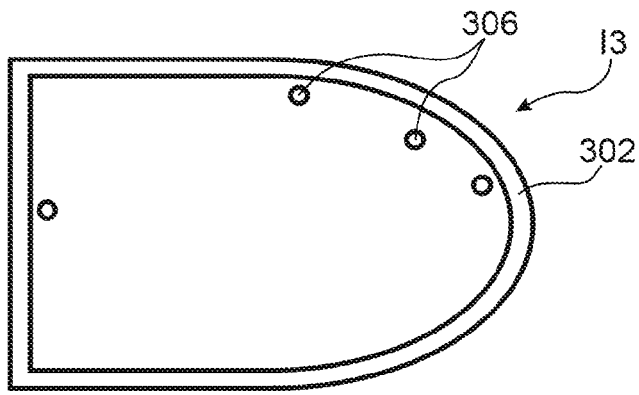
FIGS. 4A and 4B are schematic representations of different examples of the tactile interface according to the invention.
Figure 4B:
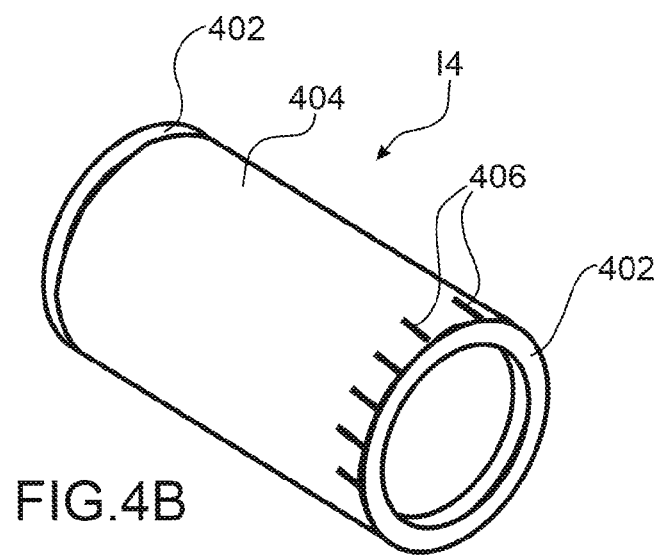

FIGS. 4A and 4B show other example embodiments of a tactile interface 13, 14 according to the invention.

In FIG. 4A, the support 302 has an ogive shape, the actuators 306 being located near the frame.

In FIG. 4B, the interface 14 has the shape of a rotation-symmetrical cylinder, the surface 404 being stretched between two frames 402 in the form of a ring. The actuators 406 are of the "bender" type as shown in FIG. 3.

FIGS. 4C and 4D show tactile interfaces 15, 16 according to another example embodiment of the invention. These interfaces 15, 16 differ from those described above in that the surfaces 504, 604 are stretched not over a frame but by means of a pressurized fluid. In FIG. 4C, the surface 504 defines a closed volume in the form of a sphere filled with pressurized fluid and in FIG. 4D, the surface 604 defines a closed volume in the form of a ring filled with a pressurized fluid. The actuators 506, 606 are distributed outside the volume and are capable of exerting a force normal to the surface 504, 604. The arrangement of the actuators 506, 606 is shown only for the purpose of illustration.

For example, the closed volume can be mounted on a support on which the actuators are also arranged, the actuators applying forces at the surface to produce tactile stimulations at different points of the surface.

FIGS. 7A to 7C show several example embodiments of surfaces 704, 804, 904 slowing the progression of acoustic waves so as to have a speed of propagation of acoustic waves in the surface that is slow enough to obtain focus at sufficient resolutions compatible with tactile stimulation. In the examples shown, the surfaces are made of a plurality of materials and/or a plurality of phases. By associating a plurality of materials and/or a plurality of phases, it is possible to obtain:

$$\frac{c^3(\lambda)}{\rho\lambda} < 10^{13}$$

$$\forall \lambda \geq 2 \text{ cm}$$

In FIG. 7A, the surface 704 comprises a liquid 708 confined between two sheets 710, the liquid 708 enables the surface to be made heavy without increasing the stiffness and thus makes it possible to reduce the speed of propagation of the transverse waves. These sheets can be made of polymer materials, thin glass or the like, and the liquid may be water, an oil or a gel, for example.

In FIG. 7B, the surface 804 has rigid pins 812 embedded or not in a resilient material 814. Two elastomers of different stiffnesses may be used, for example.

In FIG. 7C, the surface 904 comprises a structure made of a first material 916 and cavities 918 in the structure filled with a second material 920. It is thus possible to use, for example, a filled polymer so as to modify the density thereof.

Figure 8A:
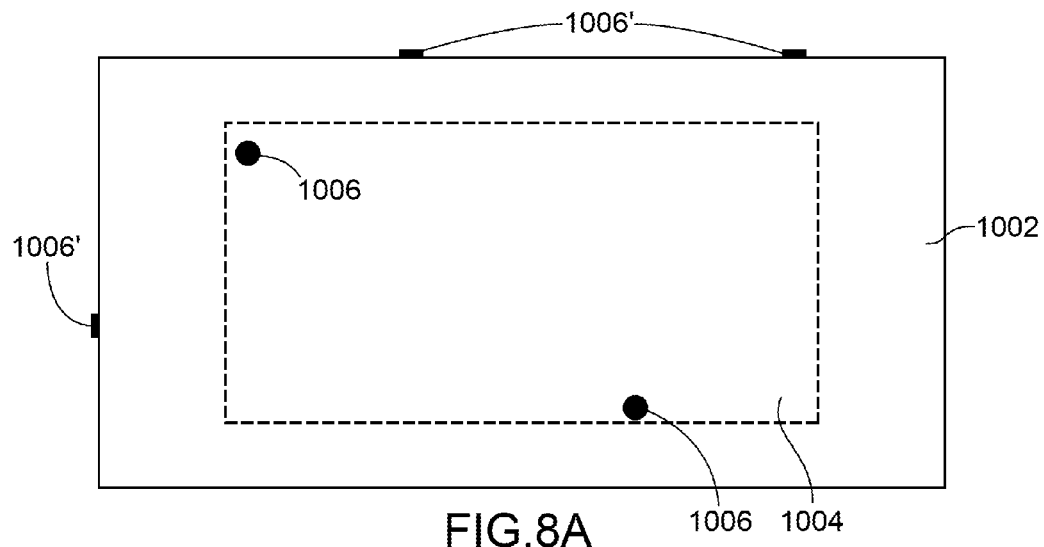
FIGS. 8A and 8B are top and longitudinal cross-section views of another example embodiment of a tactile interface according to the invention.
Figure 8B:
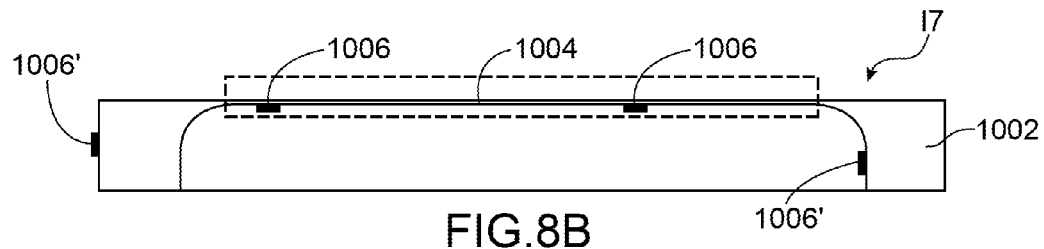

FIGS. 8A and 8B show another example embodiment of an interface 17, in which actuators 1006 directly apply a force on the surface and actuators 1006' directly apply their force not on the surface but on the support 1002.

In the example shown, the support 1002 and the surface 1004 are integrally formed, the support 1002 having a greater thickness than that of the surface so as to offer a certain rigidity, but this is in no way limiting.

As can be seen in this example embodiment, the actuators 1006' apply a force parallel to the surface.

The forces applied by the actuators on the support are not necessarily parallel to the surface but can be perpendicular to it, i.e. have a direction forming an angle of between 0 and 90° with the surface.

We will now describe two controls for actuators of the tactile interface according to the invention.

Figure 9:
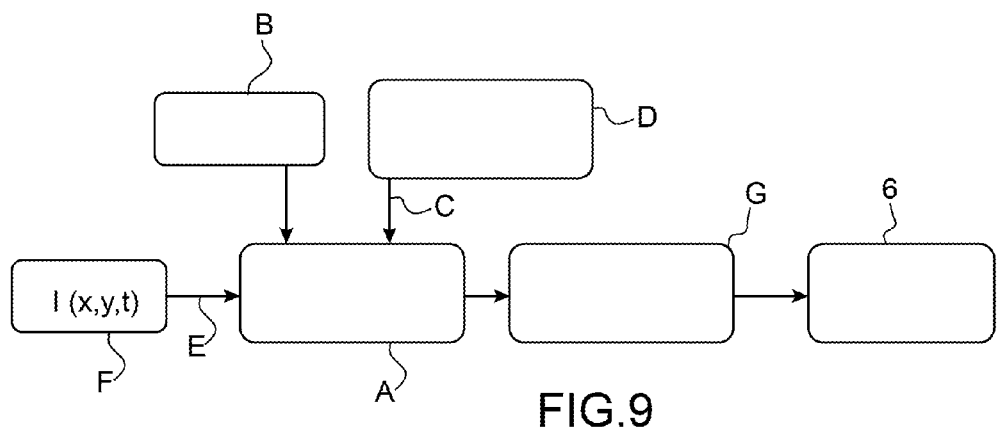
FIG. 9 is a schematic representation of an example of a control of a tactile stimulation interface according to the invention.

FIG. 9 shows a schematic representation of a control.

The control comprises a unit for determining A actuation signals to be sent to the actuators, a modal base or an impulse response base B, a connection C to the sensors D that may be implemented and a connection E to a module F providing the image to be displayed on the interface, i.e. the tactile stimulation to be generated on the surface and an actuator controller G that addresses the signals calculated by the determination unit A at each actuator and performs a power amplification of the signals before the transmission to the actuators.

The impulse response base B is a database comprising the forces to be applied at the surface that have been calculated by the time-reversal method.

The modal base forms a database of the spatial profile $\phi_n(x, y)$ of a given number N of specific modes of the flexible surface when it is directly actuated. In the case of excitation on the frame, it then involves modes of the flexible surface and frame assembly as well as the frequencies $\omega_n$ thereof. The signals to be sent to the actuator(s) are calculated during operation of the interface by the time-reversal method.

Module F controls the display of one or more points or a contour at time t0, with a given amplitude. I(x, y, t) designates the amplitude desired at the coordinate point (x, y) at time t. For example, in the case of an interface on a mobile telephone or digital tablet screen, the module may be linked to the control of the display on the screen.

As indicated above, the interface may also be equipped with a temperature sensor D for detection, which provides information capable of modifying the control signals transmitted to the actuators.

The calculation of the actuator control signals is performed on the basis of the image to be displayed, the modal base or the impulse response base and signals sent by the sensors. For example, the signal $s_q(t)$ calculated for actuator q located at $(x_q, y_q)$, for a desired image $I(x, y)$ at time $t_0$ is as follows, depending on whether one is working from the modal base $\phi_n$, $\omega_n$ or from an impulse response base h, respectively.

From the modal base:

$$s_q(t) = \sum_{n=1}^{N} \tilde{\phi}_n(x_q, y_q) \int\int_S \tilde{\phi}_n(x, y) \cdot I(x, y, t_0) dx dy \cdot \cos(\tilde{\omega}_n(T - t + t_0))$$

From the impulse response base:

$$s_q(t) = \sum_{p=1}^{P} I(x_p, y_p, t_0) \cdot h_q(x_q, h_p, T - t + t_0)$$

$$t_0 - T < t < t_0$$

$\tilde{\phi}_n$ and are $\tilde{\omega}_n$ dependent upon the modal base $\phi_n$, $\omega_n$ as well as quantities provided by the sensors. T is either a constant or is calculated as a function of the input parameters of the calculation unit. $h_q(x_p, y_p)$ is the impulse response between the actuator q and the point of the surface located at $h_q(x_p, y_p)$. This calculation may, however, be implemented differently. The signal thus calculated can then undergo a plurality of transformations of the amplification, filtering or repetition type, or the like.

Owing to the invention and the choice of the surface, it is possible to form focal spots, the size of which is on the order of the cm.

Advantageously, the implementation of the time-reversal method makes it possible to shift the actuators to the edge of the surface. Thus, by using a surface made of a transparent material, the tactile interface may advantageously be superimposed on a screen, the control of the stimulation then being associated with the display on the screen.

Owing to the invention, the actuators may be of reduced power. In fact, all of the actuators may contribute to the generation of a stimulus at a point by all focusing on this point. Conversely, in tactile interfaces of the type with an actuator matrix of the prior art, each actuator helps to generate a tactile stimulus at a point and the other actuators cannot contribute to the generation of said stimulus. This reduced power makes it possible to use actuators of reduced size.

In addition, owing to the invention, it is possible to create tactile stimuli at different points on the surface simultaneously, by adding the signals corresponding to each of the points. If we consider the signals $s_a(t)$ and $s_b(t)$ transmitted by an actuator in order to focus on points a and b, the actuator is ordered to transmit a signal $s(t)=s_a(t)+s_b(t)$. Thus, an operator placing multiple fingers on the interface according to the invention may feel a different stimulus on each finger.

The possibility of creating a plurality of focal points simultaneously allows for the generation of complex reliefs such as the contours of an image. The impulses generated locally may be repeated at the desired frequency and be amplitude-modulated, resulting in a richness in the tactile information transmitted.

Figure 5A:
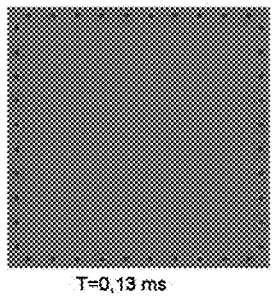
FIGS. 5A to 5L are top views of a tactile interface in different states of operation for focusing a point at the surface.
Figure 5B:
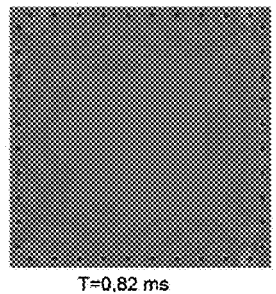
Figure 5C:
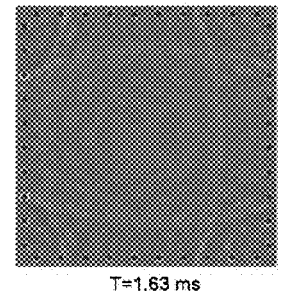
Figure 5D:
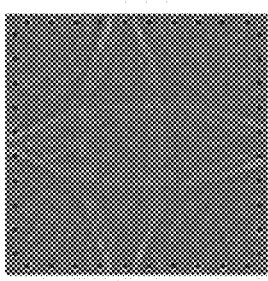
Figure 5E:
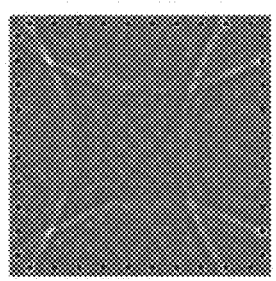
Figure 5F:
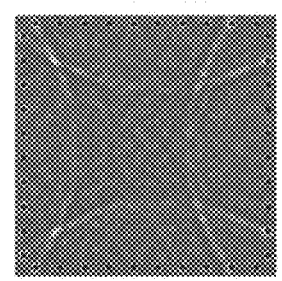
Figure 5G:
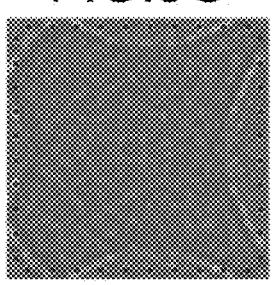
Figure 5H:
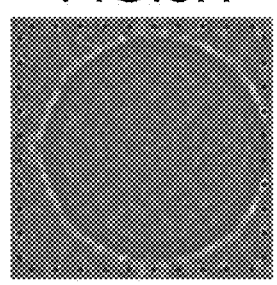
Figure 5I:
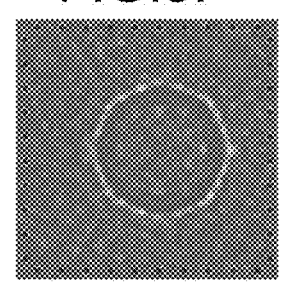
Figure 5J:
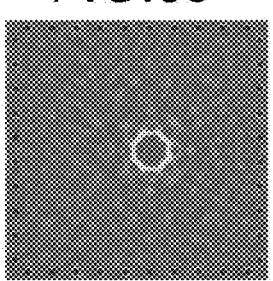
Figure 5K:
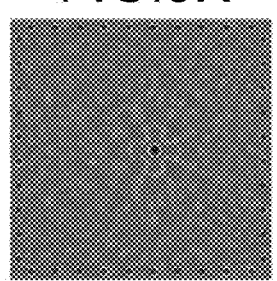
Figure 5L:
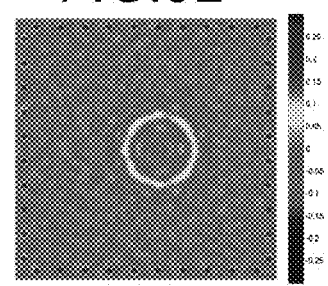

FIGS. 5A to 5L show the surface of a tactile interface according to the invention in different states adopted by the surface during the generation of a tactile stimulus at a point on the surface, and therefore the acoustic waves generated by the actuators are focused at this point. In FIG. 5K, the tactile interface is in its state of generating a tactile stimulus at a point.

Figure 6A:
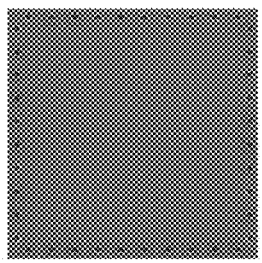
FIGS. 6A to 6L are top views of a tactile interface in different states of operation for focusing a triangle at the surface.
Figure 6B:
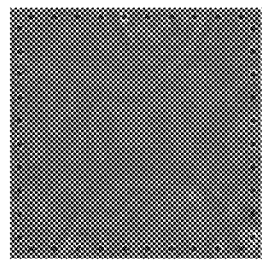
Figure 6C:
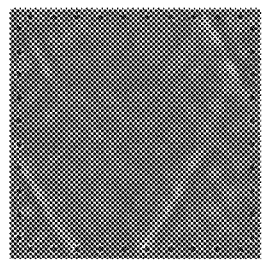
Figure 6D:
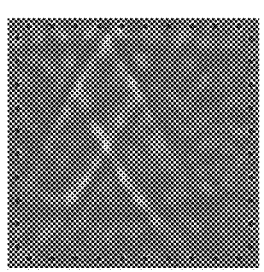
Figure 6E:
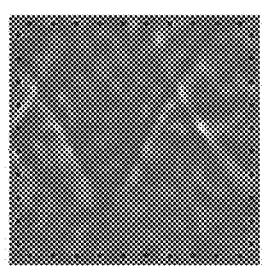
Figure 6F:
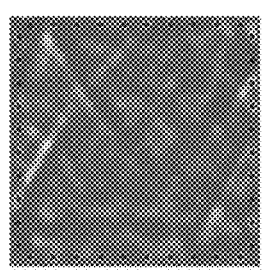
Figure 6G:
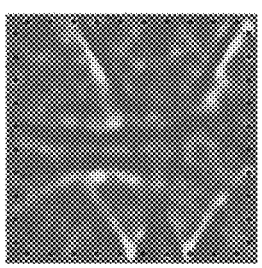
Figure 6H:
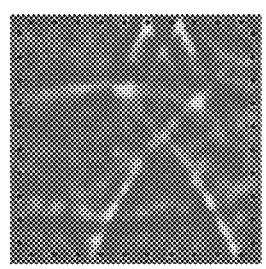
Figure 6I:
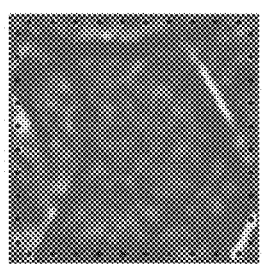
Figure 6J:
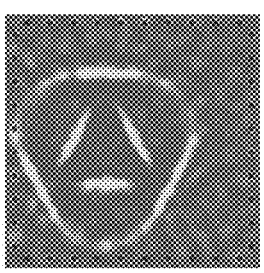
Figure 6K:
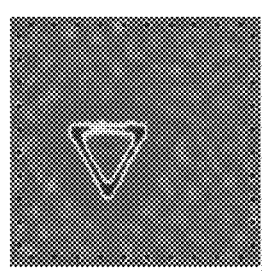
Figure 6L:
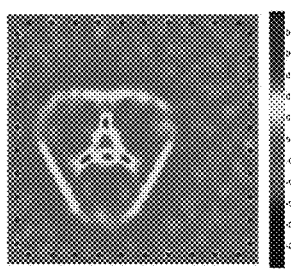

FIGS. 6A to 6L show the surface of a tactile interface according to the invention in different states adopted by the surface during the generation of a tactile stimulus in the form of a triangle. In FIG. 6K, the tactile interface is in its state of generating the tactile stimulus in the form of a triangle.

As explained above, a single actuator may focus a plurality of points or a line, a line being constructed by being broken down into a sum of points. Each actuator contributes to the creation of this set of points and can therefore create a pattern on the flexible surface.

The implementation of a plurality of actuators focusing the same points makes it possible to improve the contrast obtained.

The actuators can be located on the frame and act on the contour of the surface but also act on a more central area of the surface.

This invention can be implemented in human-machine tactile interfaces, such as:
- touch screens in consumer electronics, telephones, readers, touch pads, etc.;
- large-scale touch screens for data mining, simulators, etc.; automobile, aviation and marine crew compartments;
- surgical intervention devices, probes, robot systems;
- information access means for individuals with sensory and motor deficits.

This invention can be implemented in the optical field: in beam scanning systems, for example in image projectors, and in the field of adaptive optics.

This invention can be implemented in the acoustic field, for example in acoustic lenses.

What is claimed is:

1. Tactile stimulation interface comprising an element intended to be tactilely explored by an operator, said element intended to be tactilely explored being formed by at least one surface, at least one actuator configured to apply a force on said surface, and a controller for controlling said at least one actuator, said controller being configured to send, to the actuator, signals corresponding to the forces to be applied to said surface according to the tactile stimulation to be generated on the surface, wherein said forces are determined by a time-reversal method, said surface comprising at least one area such that:

$$c^3(\lambda)/\rho\lambda < 10^{13} \; \forall \lambda \geq 2 \text{ cm}$$

λ is a wavelength of bending waves being propagated in said area,
c is a speed of the bending waves,
ρ is a mass per surface unit of said area, and
wherein said at least one actuator has a bandwidth extending between 1 Hz and 20 kHz so as to excite a large number of modes specific to said surface.

2. Tactile stimulation interface according to claim 1, comprising at least one support forming a frame holding the surface, said actuator being located near the frame.

3. Tactile stimulation interface according to claim 2, wherein the actuator applies the force directly at the surface, perpendicularly to the surface.

4. Tactile stimulation interface according to claim 2, wherein the actuator applies the force directly at the surface, perpendicularly to the surface.

5. Tactile stimulation interface according to claim 1, comprising a support in the form of a frame from which the surface is suspended, at least one first and one second actuator, the first actuator applying a force directly on the surface and the second actuator applying a force on the support.

6. Tactile stimulation interface according to claim 1, wherein the surface defines a closed volume filled with a pressurized fluid, said surface being stretched by the pressurized fluid, said interface comprising a support for said closed volume and at least one actuator mounted on the support.

7. Tactile stimulation interface according to claim 1, comprising at least one sensor of a parameter capable of influencing the effect of the forces on the surface.

8. Tactile stimulation interface according to claim 7, comprising at least one sensor for detecting the presence of the operator in contact with the interface.

9. Tactile stimulation interface according to claim 1, wherein the actuator is an electromagnetic actuator.

10. Tactile stimulation interface according to claim 2, wherein the actuator is an electromagnetic actuator and wherein the actuator comprises a coil, a soft iron core and a magnet, said magnet being fixed on the surface and the coil being fixed on the support.

11. Tactile stimulation interface according to claim 1, wherein the actuator is made of a piezoelectric material.

12. Tactile stimulation interface according to claim 1, wherein the actuator is made of a piezoelectric material and wherein the actuator comprises a beam, one end of which is built into the support and the other end of which is configured to apply a force on the surface.

13. Tactile stimulation interface according to claim 1, wherein the surface comprises pins intended to come into contact with the operator.

14. Tactile stimulation interface according to claim 1, wherein the surface comprises at least two different materials and/or two different phases.

15. Tactile stimulation interface according to claim 1, wherein the surface is transparent.

16. Tactile stimulation interface according to claim 1, wherein the surface comprises at least one film of a polymer material or a composite material.

17. Tactile stimulation interface according to claim 16, comprising a support over which the surface is stretched.

18. Tactile stimulation interface according to claim 1, wherein the surface comprises at least one glass plate having a thickness of around 100 μm.

19. Tactile stimulation interface according to claim 1, wherein the controller comprises a modal base or an impulse response base.

20. Tactile stimulation interface according to claim 19, wherein the impulse response base contains signals to be transmitted to the actuator, said signals having been determined by the time-reversal method.

21. Tactile stimulation interface according to claim 19, wherein the modal base comprises a unit for determining signals to be transmitted to the actuator by the time-reversal method.

22. Tactile stimulation interface according to claim 1, wherein the controller comprises an actuator controller transmitting said signals to said actuator.

23. Tactile stimulation interface according to claim 1, wherein the speed of the bending waves is on the order of 50 m/s.

* * * * *

UNITED STATES PATENT AND TRADEMARK OFFICE
CERTIFICATE OF CORRECTION

PATENT NO. : 9,436,284 B2
APPLICATION NO. : 14/405634
DATED : September 6, 2016
INVENTOR(S) : Hudin et al.

It is certified that error appears in the above-identified patent and that said Letters Patent is hereby corrected as shown below:

In the specification:

Column 10, line 34: please delete "$h_q$"

Signed and Sealed this
Eighth Day of November, 2016

Michelle K. Lee
*Director of the United States Patent and Trademark Office*